United States Patent
Kalis

(10) Patent No.: US 8,219,224 B2
(45) Date of Patent: Jul. 10, 2012

(54) AUTOMATIC MUSIC MANAGEMENT METHODS AND SYSTEMS

(75) Inventor: Jeffrey J. Kalis, Sparta, MI (US)

(73) Assignee: AMI Entertainment Network, Inc., Bristol, PA (US)

( * ) Notice: Subject to any disclaimer, the term of this patent is extended or adjusted under 35 U.S.C. 154(b) by 1186 days.

(21) Appl. No.: 11/843,574

(22) Filed: Aug. 22, 2007

(65) Prior Publication Data

US 2008/0056075 A1    Mar. 6, 2008

Related U.S. Application Data

(60) Provisional application No. 60/841,538, filed on Sep. 1, 2006.

(51) Int. Cl.
  *G06F 17/00* (2006.01)
  *G06F 15/16* (2006.01)
  *G11B 21/08* (2006.01)
  *H04B 5/00* (2006.01)

(52) U.S. Cl. .......... 700/94; 369/30.01; 381/79; 709/232

(58) Field of Classification Search .................... 700/94; 705/52; 709/216, 219, 232; 715/727; 369/30.01, 369/30.06; 387/79
See application file for complete search history.

(56) References Cited

U.S. PATENT DOCUMENTS

| | | | |
|---|---|---|---|
| 5,355,302 A * | 10/1994 | Martin et al. | 700/234 |
| 5,896,506 A * | 4/1999 | Ali et al. | 709/216 |
| 7,024,465 B1 * | 4/2006 | Young et al. | 709/219 |
| 2002/0126141 A1 * | 9/2002 | Mastronardi | 345/716 |
| 2004/0034536 A1 * | 2/2004 | Hughes | 704/278 |
| 2004/0122773 A1 | 6/2004 | McCombs et al. | |
| 2006/0074750 A1 | 4/2006 | Clark et al. | |
| 2006/0163358 A1 | 7/2006 | Biderman | |
| 2009/0076881 A1 * | 3/2009 | Svendsen | 705/10 |
| 2009/0177299 A1 * | 7/2009 | Van De Sluis et al. | 700/94 |

* cited by examiner

*Primary Examiner* — Jesse Elbin
(74) *Attorney, Agent, or Firm* — Panitch Schwarze Belisario & Nadel LLP

(57) ABSTRACT

Systems and methods of managing entertainment content on a computer jukebox are provided in which, in exemplary embodiments, a digital file is transferred from a data center to a temporary cache in a digital memory of the computer jukebox in response to a user selection and the file is transferred from the temporary cache to a local file in the digital memory according to predetermined criteria. Also provided is a system and method of managing entertainment content on a computer jukebox in which, in one embodiment, the least popular albums are removed from the digital memory of the computer jukebox if the digital memory has reached a predetermined memory limit and a predetermined number of the most popular albums not already in the digital memory are added to the digital memory.

17 Claims, 6 Drawing Sheets

AUTOMATIC MUSIC MANAGEMENT METHODS AND SYSTEMS

This application claims priority to U.S. Provisional Patent Application No. 60/841,538, filed Sep. 1, 2006, the disclosure of which is incorporated by reference in its entirety.

BACKGROUND

Traditionally, jukeboxes were large machines containing a collection of vinyl records or compact discs (CD's) and a record player or CD player to play songs selected by users. Because these jukeboxes were mainly located in public establishments, such as bars and restaurants, routinely updating conventional jukeboxes was a lengthy and cumbersome task, requiring routemen to travel to each jukebox location to replace outdated recordings with up-to-date records or CD's.

The development of computer jukeboxes provided a major advance in ease of music management for jukeboxes because the songs in a computer jukebox are stored in digital format on a digital memory. Therefore, because computer jukeboxes no longer require cumbersome records or CD's, computer jukeboxes may be very small and may be located in a wide variety of public and private locations. Furthermore, computer jukeboxes are not limited to playing music, but may play songs, videos, and other forms of entertainment ("entertainment content"). As used herein, the term "song," "music," "album," or "video" also refers generally to entertainment content. Essentially, any computer system capable of playing entertainment content on demand or in any automated fashion is a computer jukebox.

Computer jukeboxes have an additional advantage regarding entertainment content management in that a computer jukebox may be linked to a data center, which can optionally be located remotely, to download entertainment content. A computer jukebox administrator may therefore add new entertainment content, such as songs or entire albums, to a local file in the digital memory by selecting and downloading music from the data center. Music or other forms of entertainment content stored in the local file of the digital memory is referred to as "local music".

An administrator of a conventional computer jukebox must choose which songs or albums to download to the local file in the digital memory. Conventionally, the administrator must choose music based on popularity reports generated by the computer jukebox or by fielding requests from users. However, these methods are time consuming and imprecise, and therefore, an administrator may have difficulty choosing the most popular music for the computer jukebox users.

The digital memory of computer jukeboxes may store a large number of local music files. However, the storage capacity of a digital memory may only accommodate a finite amount of music. Therefore, an administrator may need to remove less popular songs or albums before he can add more popular songs or albums because, in conventional computer jukeboxes, local music is not automatically erased when new local music is stored to the local file of the digital memory. Again, conventional methods of selecting the least popular music to remove may be time consuming and imprecise.

Another advantage of a digital jukebox is that music stored at the data center may be available to be selected for play by a user. Therefore, a user may select a song for play that is not stored in the digital memory. Music stored at the data center but not on the digital memory of the computer jukebox is referred to as Music On Demand ("MOD") music. A large selection of local music is desirable despite the availability of MOD music, because users are generally charged more to select a MOD song than to select a local song, because the content is more readily available (e.g., there is no delay caused by the need to download the song from the data center), and because songs in the local file can still be played even if the connection to the data center is disconnected or faulty.

When a user selects a MOD song for play, the digital song file may be downloaded from the data center to the digital memory and stored in a temporary cache in the digital memory so that it may be played. This type of music is called cached MOD music. The song file may be stored in the temporary cache while the song is being played, but may be written over when a new MOD song is downloaded due to a user selecting a song for play. The computer jukebox may store a plurality of cached MOD music files in the temporary cache and may play the song from the temporary cache rather than download the MOD selection at subsequent times when a user selects that song. However, songs stored in the temporary cache will eventually be recorded over and erased when a certain number of new MOD songs are selected for play. This arrangement may lead to the undesirable result in which more popular songs are erased from the temporary cache while less popular songs are kept indefinitely in the local file.

What is needed is an automated way to manage entertainment content on a digital jukebox.

BRIEF SUMMARY OF THE INVENTION

In various exemplary embodiments, the present invention provides a system and method for managing entertainment content on a computer jukebox. The present invention provides systems and methods for the automatic transfer of entertainment content to and from a local file of a digital memory without administrator intervention. Furthermore, entertainment content is automatically added to and removed from the computer jukebox according to predetermined criteria (e.g., popularity of the entertainment content, entertainment content specially designated by the administrator, contractual limits on the amount of entertainment content that may be stored, and limited storage capacity of the digital memory).

One embodiment provides a method of managing a song on a computer jukebox, comprising transferring a song from a data center to a temporary cache in a digital memory in response to a user selection; and transferring the song from the temporary cache to a local file in the digital memory according to predetermined criteria.

In another embodiment, the invention provides a method of managing albums on a computer jukebox, comprising determining the most popular albums and least popular albums according to predetermined criteria; removing a predetermined number of the least popular albums from the digital memory if the digital memory has reached a predetermined memory limit; and adding a predetermined number of the most popular albums not already in the digital memory to the digital memory.

In another embodiment, the invention is directed to a computer jukebox system, comprising a digital memory for storing a plurality of songs in digital files, the digital memory comprising a temporary cache and a local file, an audio output unit for playing the plurality of songs, a processor for transferring the plurality of songs from the digital memory to the audio output unit, a data center comprising at least one server for transferring a song to the temporary cache in response to a user selection, and a communication interface for receiving songs from the data center; wherein the processor transfers the song from the temporary cache to the local file according to predetermined criteria.

In another exemplary embodiment, the invention is directed to a computer jukebox, comprising a digital memory for storing a plurality of songs in digital files, the digital memory comprising a temporary cache and a local file; an audio output unit for playing the plurality of songs; a processor for transferring the plurality of songs from the digital memory to the audio output unit; and a communication interface for receiving songs from a data center, wherein the temporary cache stores a song from a data center in response to a user selection, and wherein the processor transfers the song from the temporary cache to the local file according to predetermined criteria.

In another exemplary embodiment, the invention is directed to a computer jukebox, comprising a digital memory for storing a plurality of songs in digital files; an audio output unit for playing the plurality of songs; and a processor for transferring the plurality of songs from the digital memory to the audio output unit, wherein the processor determines the most popular albums and least popular albums based on user selections of songs for play, removes a predetermined number of the least popular albums from the digital memory if the predetermined memory limit has been reached, and adds a predetermined number of the most popular albums to the digital memory.

BRIEF DESCRIPTION OF THE DRAWINGS

The foregoing and other aspects of the invention will be better understood from the following detailed description of the invention, which is provided in connection with the accompanying drawings, in which.

DETAILED DESCRIPTION OF THE PREFERRED EMBODIMENTS

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that changes to the described embodiments may be made without departing from the spirit and scope of the present invention.

Figure 1:
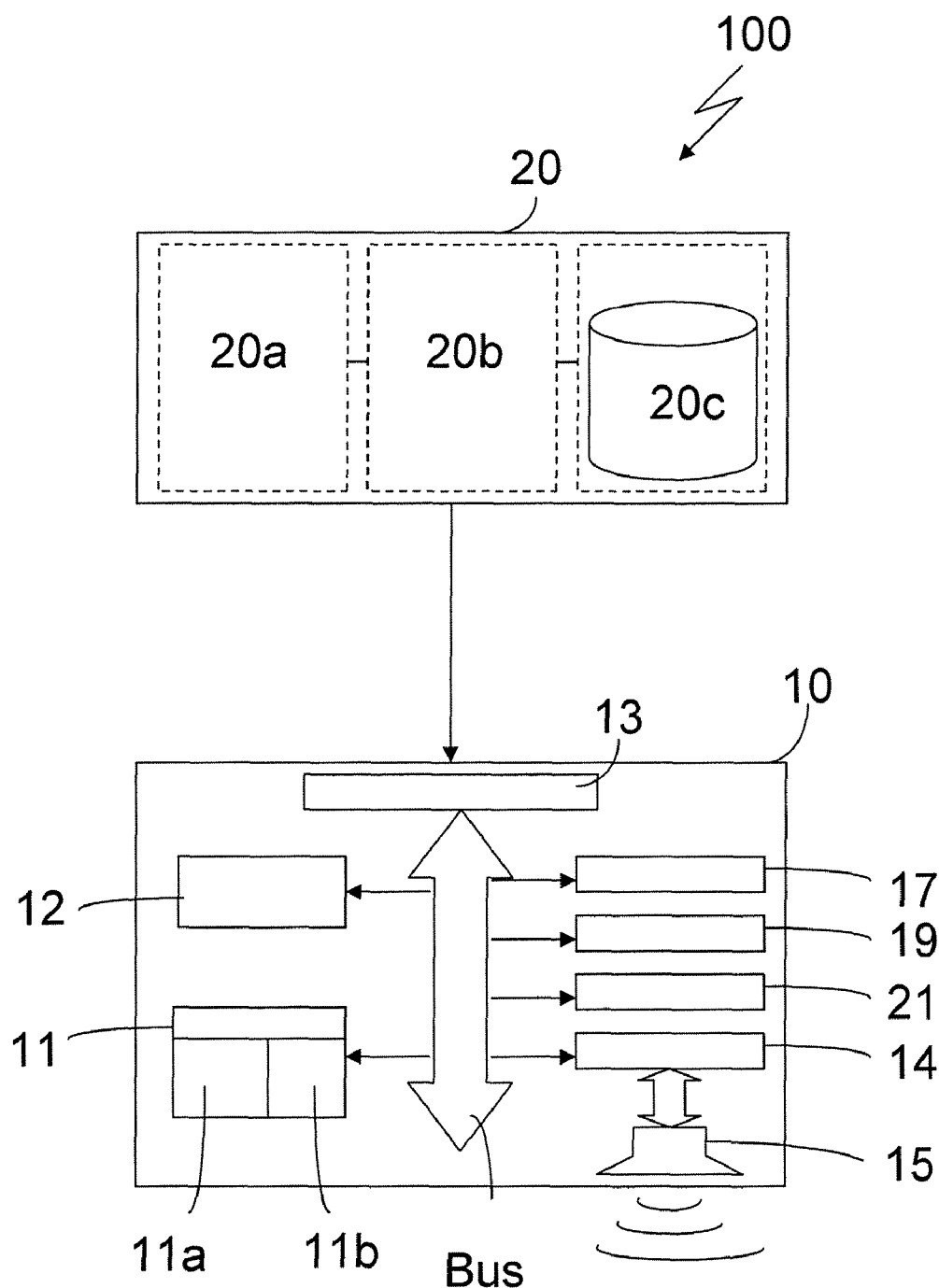
FIG. 1 is a diagram of a computer jukebox system in accordance with an embodiment of the invention.

FIG. 1 shows an exemplary portion of a jukebox system 100 according to the invention. The jukebox system 100 includes a computer jukebox 10, connected to a data center 20. The data center 20 may be a single computer server or multiple computer servers 20a, 20b, 20c, each of which may include all necessary computer parts for receiving, sending, and processing information (e.g., central processing unit(s), hard drive(s), random access memory, motherboard, etc.) to the computer jukebox 10 and optionally multiple other computer jukeboxes (not shown). When multiple servers 20a, 20b, 20c are used, each may provide particularized functions, such as communicating with the computer jukebox 10, storing digital music files that can be downloaded by the computer jukebox 10, and storing a database containing information necessary for managing the computer jukebox 10. The database may also contain information for calculating billing and/or royalty payments. The data center 20 may be one centrally located data center, a plurality of data centers, a series of regional data centers, or a combination of centrally located and regional data centers.

The computer jukebox 10 includes at least one digital memory 11 for storing a plurality of digital music files and information relating to the stored musical files. The digital memory can include a hard drive, a collection of hard drives, or any other type of memory capable of storing digital music files (e.g., RAM, DVD-RAM, DVD-RW, CD-RW, memory stick, memory cards (CF, SD, XD), jump drive, mp3 player, personal digital assistant, and cell phone). The digital memory 11 can optionally include a temporary cache 11a and a local file 11b. The temporary cache 11a and the local file 11b may be physically separated or merely designated as separate storage sites.

The computer jukebox 10 also has a display 21, which may display graphics, such as album covers, and also displays text such as selection instructions and song titles. The display 21 may be in the form of a touch-screen, such that a user can make his selections by pressing points on the display 21. Alternatively, a user or administrator may enter selections or otherwise interact with jukebox 10 using a user input device 19, which may include a keyboard, mouse, stylus, the display 21, or any other device capable of inputting information into the computer jukebox 10.

The computer jukebox 10 can also have a processor 12, a communication interface 13, and an audio output unit 14 coupled to at least one speaker 15 for replaying the songs. Speaker 15 may optionally be replaced by headphones, including but not limited to one or more wireless headphones, for private listening by one or more users. Audio output unit 14 may optionally be coupled to a wireless transmitter for transmission of the audio signal to a plurality of wireless audio receivers (not shown). The audio output unit 14 may include an audio card, a digital-to-analog converter, and means for decompressing compressed, digital files. The processor 12 may perform a variety of functions, including transferring the songs from the digital memory 11 to the audio output unit 14. The processor may also store information to the digital memory 11 to compile a database containing the number of times that each song is played on the computer jukebox 10. The computer jukebox 10 can further include a communication interface for receiving songs from the data center.

The computer jukebox 10 may optionally include a money detector 17, such as a coin, bill, and/or credit card acceptor. The money detector 17 can include a device for electronic detection of a source of credit or money, such as a credit card or a device with a barcode, RFID tag, or any means for transferring payment information to computer jukebox 10.

Figure 2:
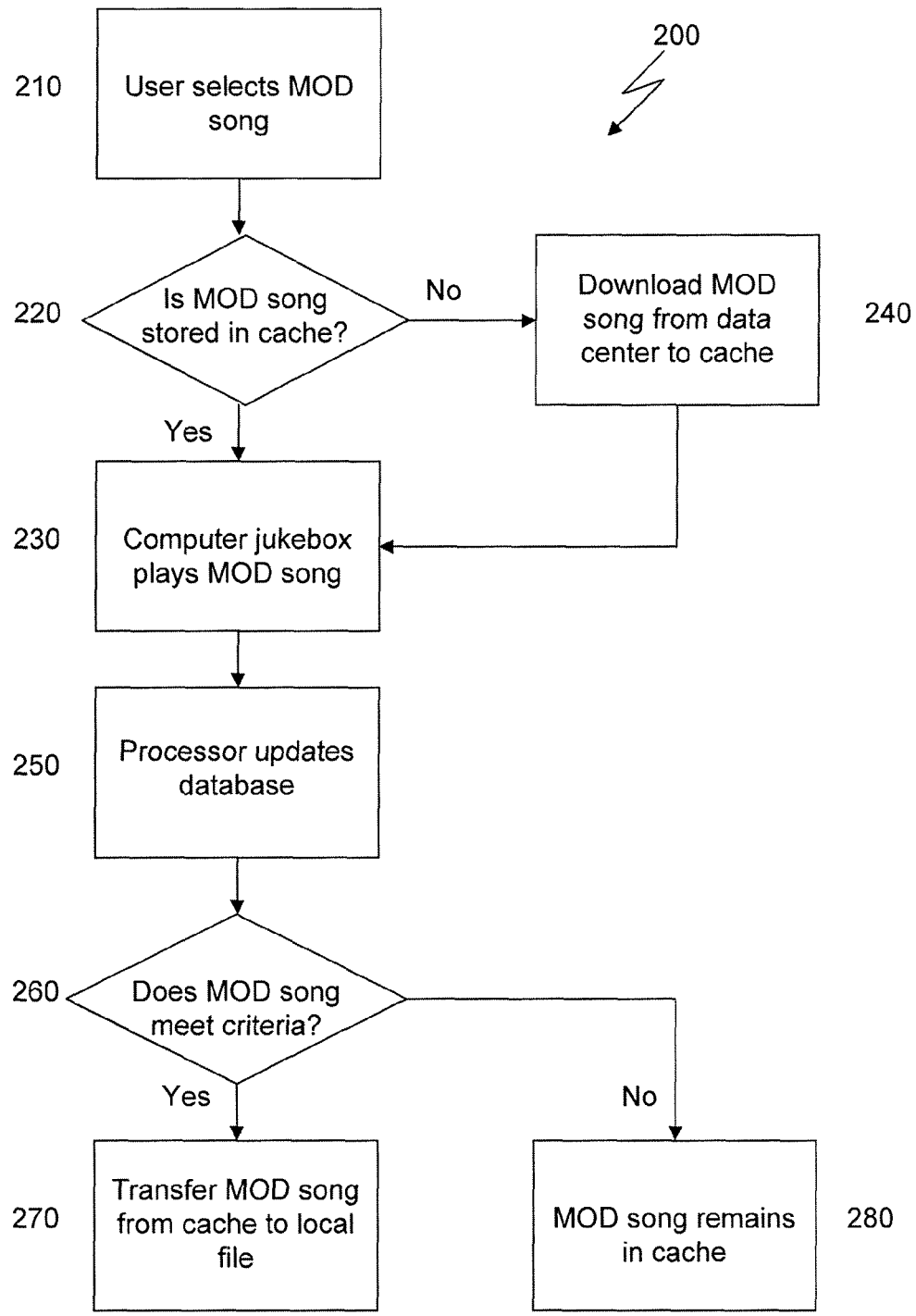
FIG. 2 is a flowchart of a method of managing entertainment content on a computer jukebox in accordance with an embodiment of the invention.

Turning to FIG. 2, an exemplary method 200 of managing entertainment content on a computer jukebox according to an embodiment of the invention is depicted.

At step 210, a user selects a MOD song for play on the computer jukebox 10 using the user input device 19. At step 220, the processor 12 will determine whether the selected MOD song is already stored in the temporary cache 11*a* of the digital memory 11 as a cached MOD song. If the selected MOD song is stored in the temporary cache 11*a*, the processor 12 will transfer the song to the audio output unit 14 to be played in step 230.

If the selected MOD song is not stored as a cached MOD song in the temporary cache 11*a*, the processor 12 will send a request to the data center 20 through the communication interface 13 and the selected MOD song will be downloaded to the temporary cache 11*a* in step 240. Once the selected MOD song is downloaded to the temporary cache 11*a*, the process will proceed to step 230 to play the song.

Next, at step 250, the processor 12 updates a database containing the number of times that songs were played on the computer jukebox 10 by including the time that the selected MOD song was played at step 250. As mentioned above, the database may be stored on the digital memory 11. In another embodiment, the database may be stored on a data center 20. After updating the database, the processor 12 performs a computation at step 260 using the updated information stored in the database to determine if the selected MOD song meets a predetermined criteria. If the selected MOD song meets the predetermined criteria, the processor 12 transfers the selected MOD song, in step 270, from the temporary cache 11*a* to the local file 11*b* in the digital memory 11. If the selected MOD song does not meet a predetermined criteria, the MOD song remains in the temporary cache 11*a*, as shown in step 280. In one embodiment, after the selected MOD song is transferred to the local file 11*b*, the entire album that the selected MOD song is included in may be transferred to the local file 11*b*.

In one embodiment, the number of MOD songs or albums that may be transferred to the local file 11*b* may be restricted due to contractual limits on the maximum number of local songs or albums that may be downloaded to the computer jukebox 10 or due to the limited amount of memory available in the local file 11*b*.

The predetermined criteria may include the number of times the MOD song has been selected for play by a user. The number of times a MOD song has been selected for play be a user may be calculated with respect to a single computer jukebox, a network of computer jukeboxes, or a portion of a network of computer jukeboxes. The portion of the network of computer jukeboxes may, for example, include jukeboxes located in a specific geographic region or jukeboxes owned or operated by one person.

In one embodiment, the predetermined criteria is a predetermined number of user selections of the MOD song. For example, the MOD song may be transferred to the local file 11*b* after the MOD song has been selected for play ten times.

In another embodiment, the predetermined criteria is a predetermined number of user selections of the song within a predetermined time period. The time period may be any desired time period, such as hours, days, weeks, years, or any increment of such desired time period. For example, the MOD song may be transferred to the local file 11*b* if the MOD song is selected for play ten times in one week.

In another embodiment, the predetermined criteria includes a calculation to determine whether the song is growing in popularity or losing popularity. The popularity growth or decline of entertainment content can be determined in various ways. For example, the popularity of the entertainment content on a single jukebox or a group of jukeboxes can be monitored over time to determine the popularity trend. Alternatively, the popularity of entertainment content can be indexed to any of a number of rating systems (e.g., BILLBOARD® top songs, radio airplay indexes, record store sales or downloads (e.g., AMAZON®, ITUNES®, etc.)). In one embodiment, the predetermined criteria includes a predetermined change in a number of user selections over time. For example, the MOD song may be transferred to the local file 11*b* if the average change in the number of times a MOD song is selected during consecutive time periods meets a predetermined value. In this way, songs that gain popularity over time may be added to the local file 11*b*, while songs that are losing popularity may remain in the temporary cache 11*a*.

In another embodiment, the predetermined criteria may include or preclude songs or albums designated by a computer jukebox administrator or a computer jukebox network administrator. For example, an administrator may designate songs or albums that are known to be popular due to ratings predictors as meeting the predetermined criteria regardless of the number of times the songs or songs on the albums have been selected for play. As another example, an administrator may designate a song or album as not meeting the predetermined criteria if, for example, that song or album is known to be offensive or otherwise unpopular.

In another embodiment, the predetermined criteria may include a calculation involving the number of times the MOD song in a predetermined category has been selected as described in any of the embodiments above. For example, a category can include songs of a particular musical genre, such as classical music, gospel, jazz, Latin pop, blues, rock, country music, electronic music, holiday music, melodic music, reggae, punk rock, hip hop, rap, movies/Broadway, new age, R&B/soul, and others. Other examples of categories include songs that contain explicit lyrics, songs with explicit album cover art, songs that relate to a particular holiday, songs performed by a specific artist or group, songs belonging to the same album, songs released in the same year or before or after a certain date, acoustical songs, songs containing lyrics, and songs of a particular length. If the computer jukebox 10 contains entertainment content such as movies, televisions shows, or video/computer games, the categories can include content that has been assigned the same maturity rating (e.g. "R", "PG", "PG13", "T", "E", etc.) Additionally, an administrator can create a custom category and assign whichever songs are desired to that category, even if the songs have no obvious relationship to each other.

In one embodiment, even if a song were to satisfy a predetermined criteria including the number of times the MOD song was played, the MOD song would not be transferred to the local file 11*b* unless it was also classified in the predetermined category. For example, the predetermined criteria may be such that a song may not be transferred to the local file 11*b* unless that song is categorized as being "country music." Additionally or alternatively, the predetermined criteria may be such that a song may not be transferred to the local file 11*b* if it is classified in a predetermined category. For example, it may be that no songs that are classified as "classical" may be transferred to the local file 11*b* regardless of how many times a user selects it for play. Multiple predetermined genres may be included in the predetermined criteria. In another embodiment, songs in different predetermined categories may have different predetermined criteria. For example, a song designated as "classical" may need to be played twenty times before it is transferred to the local file 11*b*, while a song designated as "rock" may need only be played five times before it is transferred to the local file 11*b*.

Furthermore, in another embodiment, the predetermined categories that are allowed or disallowed may be selected based on predetermined category selection criteria that may include the number of user selections of songs classified in each category. Similarly to the embodiments described above, the predetermined category selection criteria may include a determination of which categories have had a predetermined number of user selections of their songs, a predetermined number of user selections within a predetermined time period, or a predetermined change in the number of user selections over time.

Figure 3:
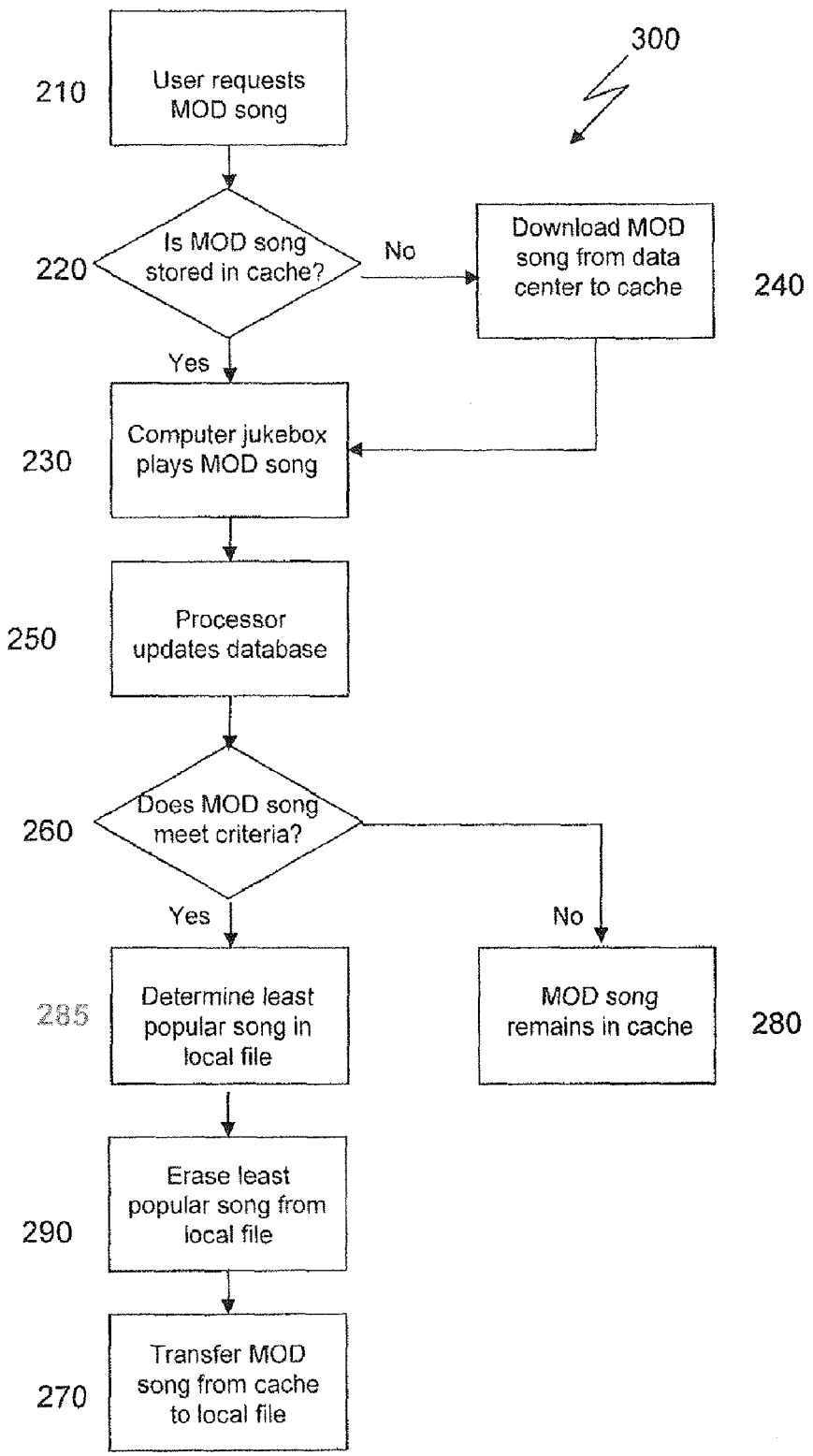
FIG. 3 is a flowchart of a method of managing entertainment content on a computer jukebox in accordance with another embodiment of the invention.

Another exemplary embodiment of the invention is shown in FIG. 3 by which the least popular songs may be removed when new songs are added. The digital memory 11 of the computer jukebox 10 has finite storage capacity, and therefore, it may be desirable to remove less popular songs when adding new songs to the local file 11b. In the exemplary method 300 shown in FIG. 3, if the processor 12 determines that the MOD song meets the predetermined criteria in step 260, the processor 12 performs another calculation at step 285 to determine which is the least popular song stored in the local file 11b using a predetermined criteria. The predetermined criteria for determining which song is the least popular may be similar to the embodiments described above and may include a count of the number of times each song was selected by users, the number of times each song was selected by users in a predetermined time period, or the change in the number of user selections of each song over time. After the least popular song is determined, that song is erased from the local file 11b at step 290 to increase the available memory of the local file 11b. The least popular song may be erased by actually removing the song from the local file 11b or may be erased by merely designating that the song may be written over with other information or songs, for example, as memory is needed for other content or functions. Alternatively, the processor 12 can determine whether the local file 11b has reached a predetermined memory limit and subsequently only erase the least popular song from the local file 11b if the predetermined memory limit has been reached. Then, at step 270, the selected MOD song can be transferred from the temporary cache 11a to the local file 11b.

The steps of the various embodiments presented need not be performed in the order presented in FIG. 2 and FIG. 3 and may be performed in any suitable order. For example, the processor may perform the computation in step 260 before or during the time that the selected MOD song is being played. Alternatively, the processor may perform the computation in step 260 on all of the cached MOD songs periodically and does not necessarily need to wait for a user to select the song for play.

Figure 4:
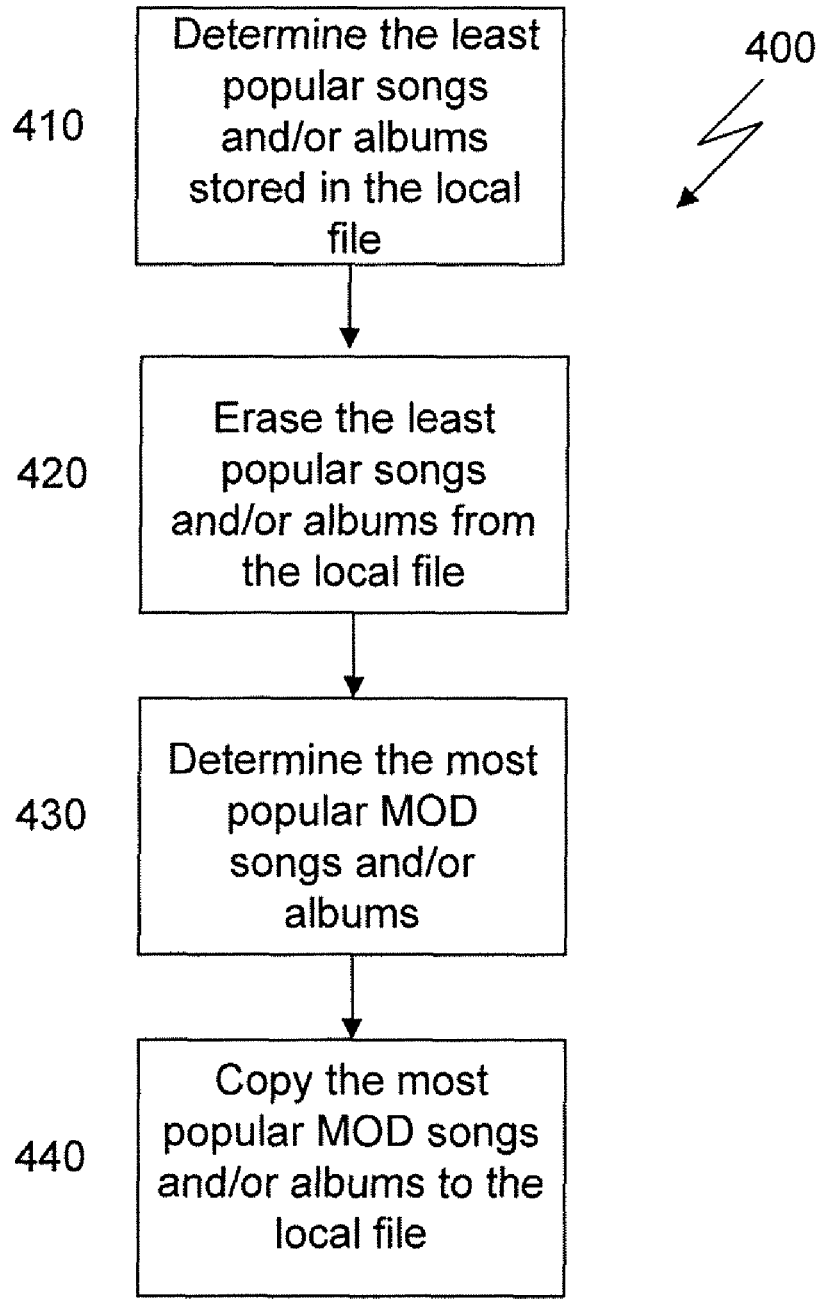
FIG. 4 is a flowchart of a method of managing entertainment content on a computer jukebox in accordance with another embodiment of the invention.

An exemplary method 400 of managing entertainment content on a computer jukebox according to another embodiment of the invention is depicted in FIG. 4. A computer jukebox administrator may wish to add songs and/or entire albums of songs to the local file 11b of a digital jukebox 10. However, other songs or albums may need to be removed from the local file 11b to make room for the new songs or albums. In accordance with this exemplary method, a computer jukebox 10 periodically removes the least popular songs or albums and adds the most popular songs and/or albums to the local file 11b based on the song or album's local popularity.

In FIG. 4, at step 410, the processor 12 uses the information from the database containing the time that each song is played on the computer jukebox 10 to rank all of the songs or albums stored in the local file 11b in order of popularity. The popularity of the songs may be determined based on predetermined criteria similar to the embodiments described above and may include a count of the number of times each song was selected by users, the number of times each song was selected by users in a predetermined time period, or the change in the number of user selections of each song over time. The popularity of the albums may be determined based on predetermined criteria similar to the embodiments described above and may include a count of the number of times the songs from each album were selected by users, the number of times the songs from each album were selected by users in a predetermined time period, or the change in the number of user selections of the songs from each album over time.

Next, at step 420, the processor 12 erases a predetermined number of the least popular songs and/or albums from the local file 11b. The predetermined number of songs and/or albums may include only songs, only albums, or any combination of the two.

At step 430, the processor 12 determines the most popular MOD songs and/or albums containing MOD songs. The popularity of the MOD songs may be determined based on predetermined criteria similar to the embodiments described above and may include a count of the number of times each MOD song was selected by users, the number of times each MOD song was selected by users in a predetermined time period, or the change in the number of user selections of each MOD song over time. The most popular albums containing MOD songs may be may be determined based on predetermined criteria similar to the embodiments described above and may include a count of the number of times the MOD songs from each album were selected by users, the number of times the MOD songs from each album were selected by users in a predetermined time period, or the change in the number of user selections of the MOD songs from each album over time.

At step 440, a predetermined number of songs and/or albums is downloaded from the data center 20 to the local file 11b of the digital jukebox 10. The predetermined number of songs and/or albums may be the same as or different then the predetermined number of songs and/or albums erased. In one embodiment, the predetermined number of songs and/or albums can be determined by contractual limits on the maximum number of local songs and/or albums that can be downloaded to the computer jukebox 10 or due to the limited amount of memory available in the local file 11b.

Figure 5:
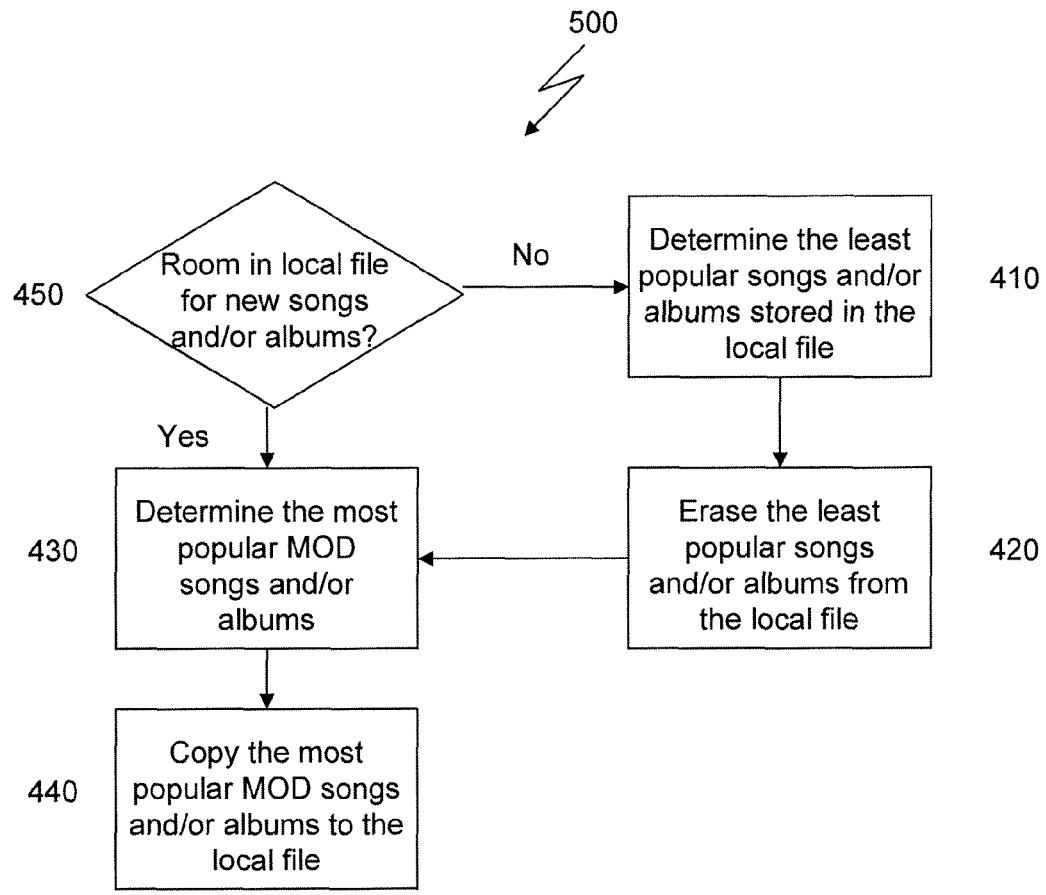
FIG. 5 is a flowchart of a method of managing entertainment content on a computer jukebox in accordance with another embodiment of the invention.

An exemplary method 500 of managing entertainment content on a computer jukebox 10 according to another embodiment of the invention is depicted in FIG. 5. In step 450, the processor determines whether there is enough space available in the local file 11b to store the predetermined number of songs and/or albums to be downloaded. If there is enough space, the method can proceed to step 430 described above to determine the most popular MOD songs and/or albums containing MOD songs and then to step 440 to download the predetermined number of songs and/or albums from the data center 20 to the local file 11b of the digital jukebox 10. If there is not enough space, the method can proceed to step 410 described above to rank all of the songs or albums stored in the local file 11b in order of popularity, then to step 420 to erase a predetermined number of the least popular songs and/or albums from the local file 11b. The method can then proceed to step 430 as described above, in which the processor 12 determines the most popular MOD songs and/or albums containing MOD songs, and step 440, as described above, in which a predetermined number of songs and/or albums is downloaded from the data center 20 to the local file 11b of the digital jukebox 10.

Figure 6:
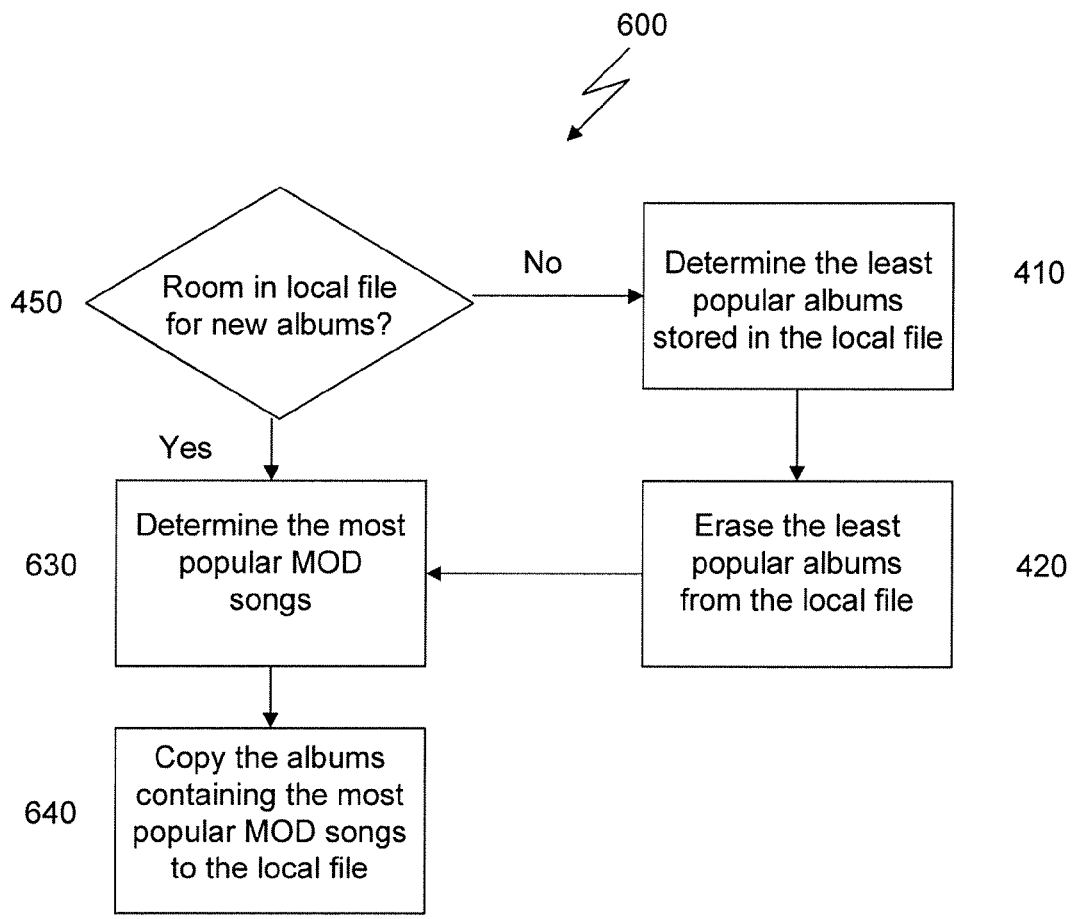
FIG. 6 is a flowchart of a method of managing entertainment content on a computer jukebox in accordance with another embodiment of the invention.

An exemplary method 600 of managing entertainment content on a computer jukebox 10 according to another embodiment of the invention is depicted in FIG. 6. Steps 410, 420, and 450 have been described above. At step 630, the processor 12 determines the most popular MOD songs. The popularity of the MOD songs may be determined based on predetermined criteria similar to the embodiments described above and may include a count of the number of times each MOD song was selected by users, the number of times each MOD song was selected by users in a predetermined time period, or the change in the number of user selections of each MOD song over time. Then, at step 640, a predetermined number of the albums containing the most popular MOD songs are downloaded from the data center 20 to the local file 11b.

The methods described in FIG. 4, FIG. 5, and FIG. 6 can be automatically implemented by the processor 12 at predetermined intervals to keep the local music of the digital jukebox 10 current. For example, the method may be implemented to download three new albums to the local file 11b at a predetermined interval (e.g., every day, every week, every two weeks, etc.).

It should be noted that the various embodiments of the present invention described above can be used in combination with each other to better manage the entertainment content of the computer jukebox 10.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. For example, a jukebox as described above includes any type of machine that is capable of storing and playing music at a users selection, such as computer, an MP3 player, or a game machine. Further, it should be understood that although the embodiments of the invention may be described with reference to "music," "songs," and "albums," that this disclosure should not be limited to such and that the various embodiments of this invention may be applied to any type of entertainment content or grouping of entertainment content that may be stored in digital form and played on demand. Additionally, any modifications, though presently unforeseeable, of the present invention that come within the spirit and scope of the following claims should be considered part of the present invention.

What is claimed as new and desired to be protected by Letters Patent of the United States is:

1. A method of managing a song on a computer jukebox comprising:
   transferring a song from a data center to a temporary cache in a digital memory of the computer jukebox in response to a user selection, the temporary cache storing a plurality of songs;
   transferring the song from the temporary cache to a local file in the digital memory according to a predetermined criteria, the predetermined criteria including criteria selected from the group consisting of a number of user selections of the song, a number of user selections of the song within a predetermined time, and a change in the number of user selections of the song over time; and
   not transferring other songs from the temporary cache to the local file that do not meet the predetermined criteria.

2. The method of claim 1, wherein the predetermined criteria further comprises a predetermined musical genre.

3. The method of claim 2, wherein the predetermined musical genre is selected based on a number of user selections of songs categorized in the predetermined musical genre.

4. The method of claim 1, further comprising transferring an album that includes the song to the local file in the digital memory.

5. The method of claim 1, further comprising:
   determining the least popular songs stored in the local file according to the predetermined criteria; and
   removing a predetermined number of the least popular songs from the local file if the local file has reached a predetermined memory limit.

6. The method of claim 1, further comprising:
   transferring multiple songs from the data center to the temporary cache in the digital memory in response to multiple user selections;
   transferring the songs that meet the predetermined criteria from the temporary cache to the local file in the digital memory;
   determining the most popular of the songs transferred from the data center to the temporary cache according to the predetermined criteria; and
   transferring a predetermined number of albums comprising the most popular of the songs transferred from the data center to the temporary cache.

7. The method of claim 6, wherein the predetermined number of albums is transferred once during a predetermined time period.

8. The method of claim 6, further comprising:
   determining the least popular albums stored in the local file based on a number of user selections of songs included on each album; and
   removing a predetermined number of the least popular albums from the local file if the memory of the local file has reached a predetermined limit.

9. A computer jukebox comprising:
   a digital memory configured to store a plurality of songs in digital files, the digital memory comprising a temporary cache and a local file;
   an audio output unit configured to play the plurality of songs;
   a communication interface configured to receive the plurality of songs from a data center, the temporary cache being configured to receive one or more of the plurality of songs from the data center in response to user selections; and
   a processor configured to transfer the plurality of songs from the digital memory to the audio output unit; the processor transferring at least one song of the plurality of songs from the temporary cache to the local file according to a predetermined criteria, the predetermined criteria including criteria selected from the group consisting of a number of user selections, a number of user selections within a predetermined time, and a change in the number of user selections over time, and the processor not transferring other songs of the plurality of songs from the temporary cache to the local file that do not meet the predetermined criteria.

10. The computer jukebox of claim 9, wherein the data center transfers multiple songs to the temporary cache in response to multiple user selections.

11. The computer jukebox of claim 9, wherein the processor automatically transfers the plurality of songs from the temporary cache to the local file according to the predetermined criteria.

12. The computer jukebox of claim 9, wherein the data center transfers a predetermined number of albums to the digital memory.

13. The computer jukebox of claim 12, wherein the albums that are transferred are albums that include songs that most exceed the predetermined criteria and that are not already stored in the local file.

14. A computer jukebox comprising:
   a digital memory configured to store a plurality of songs in digital files, the digital memory comprising a temporary cache and a local file;

an audio output unit configured to play the plurality of songs;

a processor configured to transfer the plurality of songs from the digital memory to the audio output unit; and a communication interface configured to receive the plurality of songs from a data center, the temporary cache being configured to store one or more of the plurality of songs from the data center in response to user selections, the processor transferring at least one song of the plurality of songs from the temporary cache to the local file according to a predetermined criteria, the predetermined criteria including criteria selected from the group consisting of a number of user selections, a number of user selections within a predetermined time, a change in the number of user selections over time, and the processor not transferring other songs of the plurality of songs from the temporary cache to the local file that do not meet the predetermined criteria.

15. The computer jukebox of claim 14, wherein the data center transfers multiple songs to the temporary cache in response to multiple user selections.

16. The computer jukebox of claim 14, wherein the processor automatically transfers the plurality of songs from the temporary cache to the local file according to the predetermined criteria.

17. The computer jukebox of claim 14, wherein the data center transfers a predetermined number of albums to the digital memory, the albums that are transferred are albums including songs that most exceed the predetermined criteria and that are not already stored in the local file.

* * * * *